United States Patent [19]
Lauchlan et al.

[11] 3,846,510
[45] Nov. 5, 1974

[54] NON CROSS-LINKED POLYACRYLATE AS IMPACT MODIFIER

[75] Inventors: Robert L. Lauchlan, Granger, Ind.; Hugh E. Snodgrass, Arcadia, Calif.

[73] Assignee: Uniroyal, Inc., New York, N.Y.

[22] Filed: Mar. 15, 1972

[21] Appl. No.: 235,072

[52] U.S. Cl............................................ 260/876 R
[51] Int. Cl................................................. C08f 15/18
[58] Field of Search............................ 260/876, 883

[56]           References Cited
             UNITED STATES PATENTS
3,275,712   9/1966   Siebel et al. ................... 260/876
3,502,604   3/1970   Nakatsuka et al. ................. 260/885

*Primary Examiner*—Murray Tillman
*Assistant Examiner*—J. Ziegler
*Attorney, Agent, or Firm*—Thomas A. Beck

[57]             ABSTRACT

Blends of polyacrylate elastomers with alkyl acrylate-vinyl alkylether-acrylonitrile copolymers grafted with styrene-acrylonitrile are characterized by improved impact strength.

8 Claims, No Drawings

NON CROSS-LINKED POLYACRYLATE AS IMPACT MODIFIER

BACKGROUND OF THE INVENTION

Alkyl acrylate-vinyl alkylether-acrylonitrile copolymers grafted with styrene-acrylonitrile are known and described in numerous publications including U.S. Pat. No. 3,275,712 of Hans Peter Siebel, et al. The aforesaid resins are thermoplastic molding materials possessing good resistance to oxidative embrittlement, U. V. degradation, and discoloration. However, the alkyl acrylate-vinyl alkylether-acrylonitrile copolymers grafted with styrene-acrylonitrile presently available are limited in their end use applications due to low impact strength.

STATEMENT OF THE INVENTION

The present invention relates to blends containing between about 99 and 80 percent of thermoplastic alkyl acrylatevinyl alkylether-acrylonitrile copolymers grafted with styrene-acrylonitrile and 1 to 20 percent (all percentages are expressed by weight herein) of a polyacrylate elastomer. The blends are characterized by substantially improved impact strength. Of note is the fact that the incorporation of these elastomers does not adversely affect such desirable properties of the graft copolymer resins as good resistance to the effects of weather aging.

DESCRIPTION OF THE INVENTION

In describing the graft copolymer utilized in the blend of the present invention, reference is made to the Report of Nomenclature of the Internation Union of Pure and Applied Chemistry [published in the Journal of Polymer Science, volume 8, page 260, (1952)] wherein the term "graft copolymerization" is employed to designate a given process. This process is the polymerization of a mixture of polymerizable monomers in the presence of a previously formed polymer or copolymer. A graft copolymer is a high polymer, the molecules of which consist of two or more polymeric parts of different composition chemically united together.

For purposes of this invention, the graft copolymer resin is produced by polymerization of 50 to 85 percent by weight alkyl acrylate, 5 to 20 percent by weight acrylonitrile, and 10 to 40 percent by weight vinyl alkyl ether to form a copolymer spine, with subsequent polymerization of two separate nonomers onto said copolymer spine.

Ten (10) to 90 percent by weight (based upon the copolymer spine) of styrene and acrylonitrile in the ratio of between 60:40 and 90:10 is added to the aqueous dispersion of the copolymer spine and polymerized to form the graft copolymer.

The graft copolymer is then mixed with a preformed copolymer of styrene and acrylonitrile having a monomer ratio of between 60:40 and 90:10, so that 10 to 35 percent by weight (with reference to the solids content of the whole mixture) of the graft copolymer is contained in the polymer mixture.

Suitable alkyl acrylates are those having four to eight carbon atoms in the alcohol component of the ester. Examples of such alkyl acrylates include n-butyl acrylate, t-butyl acrylate, hexyl acrylate, ethylcyclohexyl acrylate. Mixtures of these acrylates within the stated amounts may also be used.

Suitable vinyl alkyl ethers are those having alkyl groups of one to 8 carbon atoms. Vinyl methyl ether is preferably used as the vinyl alkyl ether component, but vinyl ethyl ether, vinyl butyl ether, vinyl isobutyl ether, or the ethers of higher alcohols may also be used. Mixtures of these ethers within the stated amounts may also be used.

Acrylonitrile constitutes at least 5 percent, but no more than 20 percent of the graft copolymer spine.

Preferably, the copolymer spine consists of 60 to 70 percent by weight of alkyl acrylate, 15 to 30 percent by weight of vinyl alkyl ether, and 8 to 12 percent of acrylonitrile.

The monomers which are graft polymerized on the copolymer spine are styrene or alpha methyl styrene and acrylonitrile or methacrylonitrile or combinations thereof.

Finally, the graft copolymer is admixed with a sufficient amount of a preformed copolymer of styrene and acrylonitrile, so that a resinous thermoplastic mixture results.

Styrene and acrylonitrile in the ratios indicated above comprise the preformed copolymer which constitutes between 65 and 90 percent by weight (with reference to the total mixture) of the thermoplastic resin mixture.

Copolymerization and admixture of the components which constitute the graft copolymer resin may be carried out by any conventional method and does not form part of the subject matter of the present invention. The preparation and characteristics of such alkyl acrylate-vinyl alkylether-acrylonitrile copolymers grafted with styrene-acrylonitrile are described in several publications, including U.S. Pat. No. 3,275,712, the contents of which are incorporated herein by reference.

The rubbery polyacrylates of this invention are based on $C_5 - C_{11}$ alkylacrylate monomers of which the following are examples: ethyl acrylate, n-propyl acrylate, isopropyl acrylate, n-butyl acrylate, sec. butyl acrylate, isobutyl acrylate, n-amyl acrylate and the like. Especially suitable polyacrylates are poly(ethyl acrylate) and poly (butyl acrylate).

Commercially available polyacrylate elastomers contain 10% or less of various comonomers introduced as crosslinking sites for vulcanization of the elastomer. Typical co-monomers include, for example: 2-chloroethyl vinyl ether, vinyl chloroacetate, glycidyl methacrylate, 1,2-epoxide, and β-hydroxyethyl methacrylate. Since the polyacrylate elastomers as employed in the invention are not crosslinked, the particular comonomer is non-functioning, thus is not significant.

Polyacrylate elastomers are described in detail in numerous publications including Encyclopedia of Polymer Science, Vol. 1, p 226–46, the contents of which are incorporated herein by reference.

In the compositions of the present invention, the polyacrylate elastomer comprises from 1 to 20 percent of the blend, and more preferably from 5 to 15 percent of the blend. Correspondingly, the alkyl acrylate-vinyl alkyl ether-acrylonitrile copolymer grafted with styrene-acrylonitrile constitutes at least 80 percent of the blend and more preferably between 85 and 95 percent of the blend.

The method of blending the graft copolymer resin with the polyacrylate elastomer is not critical, and does not constitute a part of this invention. Preferably the resin and elastomer are physically admixed by means of any mechanical mixing device conventionally used for mixing rubbers or plastics, such as an extruder, Banbury mixer, or differential roll mill. In order to facilitate thorough mixing of the polymers and to develop the desired improved combination of physical properties, the mechanical blending is carried out at sufficiently high temperatures to soften the polymers so that they are thoroughly dispersed and intermigled with each other.

Alternatively the matrix resin and rubber may be solution blended by dissolving the polymers in a solvent such as methyl ethyl ketone and subsequently precipitating the polymer blend by adding the solution to a non-solvent such as isopropanol, producing a homogenous blend which is then dried by a suitable method. The blend can then be molded at a temperature above its softening point.

The mixtures of the invention may contain certain other additives to plasticize, lubricate, dye, pigment, prevent oxidation of, retard flammability of, etc., the resin blends. Such additives are well known in the art and may be incorporated without departing from the scope of the invention.

The advantage which results from this invention is that it provides a new class of polymer blend resin compositions characterized by a unique combination of physical properties. In particular, one may advantageously utilize the good weather resistance of the graft copolymer resins, and through the incorporation of a polyacrylate elastomer resin obtain compositions having very high impact strength, without detrimentally affecting the other strength properties of the resin.

Further benefits obtained by blending of a polyacrylate elastomer with an alkyl acrylate-vinyl alkylether-acrylonitrile copolymers grafted with styrene-acrylonitrile resin are illustrated in the following examples which are set forth as a further description of the invention, but are not to be construed as limiting the invention thereto.

EXAMPLE 1

An alkyl acrylate-vinyl alkylether-acrylonitrile copolymer grafted with styrene-acrylonitrile was blended with a poly(ethyl acrylate) elastomer at the 10% by weight level. The graft copolymer resin consisted of:

| | % by weight |
|---|---|
| acrylonitrile | 28 |
| butyl acrylate | 13 |
| vinyl methyl ether | 5 |
| styrene | 54 |

The polyacrylate elastomer was a polymer of ethyl acrylate, coded Krynac 882X2 and manufactured by Polysar Corp. The poly(ethyl acrylate) elastomer was characterized by a Mooney viscosity of 30 (ML4 at 212°F) and a specific gravity of 1.08.

The polymers were blended in a Banbury internal shear mixer at a temperature of 330°F and a shear rate of 300 sec.$^{-1}$ for a period of 7 minutes. The polyblend was subsequently milled and calendered at 300°F and then compression molded into plaques 1/4" in thickness at 300°F and 350 psi.

The impact strength of the polyblend was measured following the procedure of ASTM D256A-56. The polyblend had an impact strength of 5.5 ft. lbs./in. notch compared to 0.8 ft. lbs./in. notch, i.e., approximately 700 percent increase in impact strength.

EXAMPLE 2

A poly(butyl acrylate) elastomer was blended with the alkyl acrylate-vinyl alkylether-acrylonitrile copolymer grafted with styrene-acrylonitrile as described in example 1 at the 10% by weight level. The poly(butyl acrylate) polymer was coded Hycar 2121X38, manufactured by the B. F. Goodrich Co., and characterized by a Mooney viscosity of 45 (ML4 at 212°F) and a specific gravity of 1.02. The polymers were blended, fabricated, and tested as described in example 1. The polyblend had an impact strength of 2.3 ft. lbs./in., a 350 percent increase in impact strength when compared to the unmodified graft copolymer resin.

EXAMPLE 3

A poly(ethyl acrylate) elastomer was blended with the alkyl acrylate-vinyl alkylether-acrylonitrile copolymer grafted with styrene-acrylonitrile as described in example 1 at the 10 percent by weight level. The poly(ethyl acrylate) polymer was coded Hycar 4032 manufactured by B. F. Goodrich Co. and characterized by a Mooney viscosity of 40 (ML4 at 212°F) and a specific gravity of 1.10. The polymers were blended, fabricated and tested as described in example 1. The polyblend exhibited a 300 percent increase in impact strength when compared to the unmodified graft copolymer resin.

EXAMPLE 4

A poly(ethyl acrylate) elastomer was blended with alkyl acrylate-vinyl alkylether-acrylonitrile copolymer grafted with styrene-acrylonitrile described in example 1 at the 10% by weight level. The poly (ethyl acrylate) polymer was coded Hycar 4031X2 manufactured by B. F. Goodrich Co. and characterized by a Mooney viscosity of 38 (ML4 at 212°F) and a specific gravity of 1.11. The polymers were blended, fabricated and tested as described in example 1. The polyblend exhibited a 300 percent increase in impact strength when compared to the unmodified graft copolymer resin.

EXAMPLE 5

A poly (ethyl acrylate) elastomer was blended with the alkyl acrylate-vinyl alkylether-acrylonitrile copolymer grafted with styrene-acrylonitrile described in example 1 at the 10 percent by weight level. The poly (ethyl acrylate) polymer was coded Cyanacryl R manufactured by American Cyanamide Co. and characterized by a Mooney viscosity of 50 (ML4 at 212°F) and a specific gravity of 1.12. The polymers were blended, fabricated and tested as described in example 1. The polyblend exhibited a 120 percent increase in impact strength when compared to the unmodified graft copolymer resin.

EXAMPLE 6

A poly (ethyl acrylate) elastomer was blended with the alkyl acrylate-vinyl alkylether-acrylonitrile copolymer grafted with styrene-acrylonitrile described in example 1 at the 10 percent by weight level. The poly (ethyl) acrylate polymer was coded Thiacril 76 manufactured by Thiokol Corp. and characterized by a Mooney viscosity of 44 (ML4 at 212°F) and specific gravity of 1.12. The polymers were blended, fabricated and tested as described in example 1. The polyblend exhibit a 320 percent increase in impact strength when compared to the unmodified graft copolymer resin.

EXAMPLE 7

A poly (ethyl acrylate) elastomer was blended with the alkyl acrylate-vinyl alkylether-acrylonitrile copolymer grafted with styrene-acrylonitrile as described in example 1 at the 5, 10 and 20 part level based on 100 parts of the graft copolymer and 4 parts of titanium dioxide. The poly (ethyl acrylate) elastomer, coded Hycar 4021, was manufactured by the B. F. Goodrich Co. and characterized by a Mooney viscosity of 55 (ML4 at 212°F) and a specific gravity of 1.10. The polymers were blended in a Banbury internal shear mixer at temperatures of 300°–320°F. for periods not exceeding 5 minutes. The polyblend was subsequently milled at 280°F., calendered at 300°F. and compression molded into plaques one-fourth inch in thickness at 300°F. and 625 psi.

The impact strengths of the polyblends as measured by ASTM D 256A-56 were 1.4, 4.5 and 8.7 ft. lbs./in. at the 5, 10 and 20 part levels of elastomer, respectively, compared to 0.8 ft. lbs./in. for the unmodified graft copolymer.

EXAMPLE 8

A series of polyacrylate elastomers were blended with the alkyl acrylate-vinyl alkylether-acrylonitrile copolymer grafted with styrene-acrylonitrile as described in Example 1 at the 10 part level based on 100 parts of the graft copolymer and 4 parts of titanium dioxide. The poly (ethyl acrylate) elastomers Hycar 4031X2 and 4032 and the poly (butyl acrylate) elastomer Hycar 2121X38 were incorporated into the graft copolymer and the polyblends fabricated as described in Example 7.

The chip impact strength of each polyblend was determined as set forth by R. L. Bergen, Jr. in *Metal Progress*, Vol. 90, No. 5, page 107 (1966). The impact strength of the polyblends were significantly greater than that of the unmodified graft copolymer both before aging and after exposure for 96 hours in the WeatherOmeter, as outlined in Table 1.

This example demonstrates the good weatherability of the polyblends of this invention compared to the unmodified graft copolymer.

TABLE I

| | | | | |
|---|---|---|---|---|
| Graft Copolymer | 100 | 100 | 100 | 100 |
| Titanium Dioxide | 4 | 4 | 4 | 4 |
| Hycar 4031X2 | — | 10 | — | — |
| Hycar 4032 | — | — | 10 | — |
| Hycar 2121X38 | — | — | — | 10 |
| Chip Impact (In. Lb./In.²) | | | | |
| a) Unaged | 317 | 403 | 345 | 333 |
| b) 96 Hrs. WeatherOmeter | 90 | 396 | 361 | 357 |

Because of their unique combination of high impact strength and excellent resistance to the effects of weather aging, the polymer blends of this invention have many and varied uses. For example, they can be used as molding compounds for the production of enclosures, furniture, and other goods especially suited for outdoor usage. They can be used to prepare extruded sheets and shapes for outdoor siding which requires both good weather resistance and high impact strength. They can be used in molding powder formulations either alone or mixed various fillers to make molded parts and articles such as gear, ratchets, bearings, cams, impact parts, gaskets, valve seats, bottles, containers, and the like. They can be used to prepare molded, calendered or extruded articles, films, coatings, threads, filaments, tapes and the like. They can be applied to a broad spectrum of uses in forms of sheets, rods, tapes and the like and are useful in electrical applications. Obviously, other modifications and variations of the present invention are possible in light of the above disclosures. It is, therefore, to be understood that changes may be made in the particular embodiments of the invention described which are within the full intended scope of the invention as defined by the appended claims.

Having thus described our invention, what we claim and desire to protect by Letters Patent is:

1. A blend composition having improved impact strength and processability comprising:
  A. between about 80 and 99 percent by weight of a matrix polyblend consisting essentially of
    a. between 10 and 35 percent by weight of a graft copolymer consisting essentially of a spine of
      i. 50 to 85 percent by weight of alkyl acrylate having four to eight carbon atoms in the alcohol component of the ester;
      ii. 10 to 40 percent by weight of vinyl alkyl ethers, said alkyl group containing one to eight carbon atoms; and
      iii. 5 to 20 percent by weight of acrylonitrile; said spine having been grafted with 10 to 90% by weight, (based upon the spine) of styrene and acrylonitrile in the ratios between 60:40 and 90:10 respectively, and
    b. between 90 and 65 percent of a separately prepared copolymer resin of styrene and acrylonitrile, having monomer ratios between 60:40 and 90:10 respectively, in admixture with
  B. between about 1 and 20% of a non-cross linked polyacrylate elastomer formed by the polymerization of monomeric alkyl esters of acrylic acid, free of substitutents in either the alkyl group or the acrylic acid and containing up to 8 carbon atoms in the alkyl group.

2. The composition defined in claim 1 wherein said alkyl acrylate is selected from the group consisting of n-butyl acrylate, t-butyl acrylate, hexyl acrylate and ethylcyclohexyl acrylate.

3. The composition defined in claim 1 wherein said vinyl alkyl ether is selected from the group consisting of vinyl methyl ether, vinyl ethyl ether, vinyl butyl ether and vinyl isobutyl ether.

4. The composition defined in claim 1 wherein said alkyl acrylate is selected from the group consisting of n-butyl acrylate, t-butyl acrylate, hexyl acrylate and ethylcyclohexyl, and said vinyl alkyl ether is selected from the group consisting of vinyl methyl ether, vinyl ethyl ether, vinyl butyl ether and vinyl isobutyl ether.

5. The composition defined in claim 4 wherein said alkyl acrylate is n-butyl acrylate and said vinyl alkyl ether is vinyl methyl ether.

6. The composition defined in claim 4 wherein said polyacrylate elastomer is prepared from a monomeric alkyl ester of acrylic acid selected from the group consisting of ethyl acrylate, n-propyl acrylate, isopropyl acrylate, n-butyl acrylate, sec. butyl acrylate, isobutyl acrylate and n-amyl acrylate.

7. The composition defined in claim 5 wherein said polyacrylate elastomer is prepared from ethyl acrylate.

8. The composition defined in claim 5 wherein said polyacrylate is prepared from butyl acrylate.

* * * * *